Figure 3:
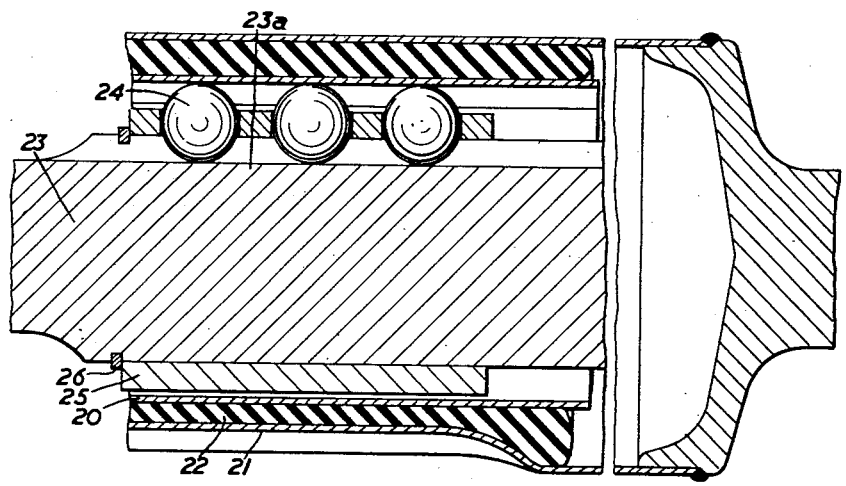

Dec. 12, 1961 W. CULL 3,012,421
RESILIENT TORQUE TRANSMITTING COUPLINGS
AND METHODS FOR THEIR MANUFACTURE
Filed July 21, 1959 2 Sheets-Sheet 1
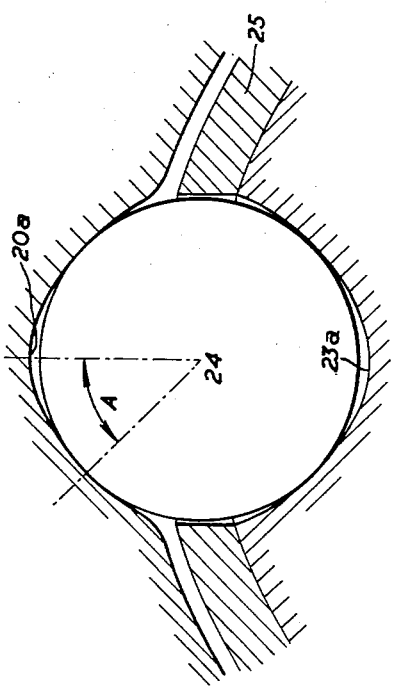
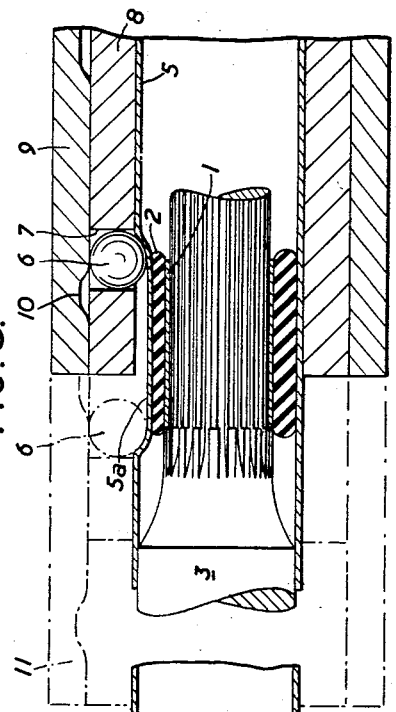
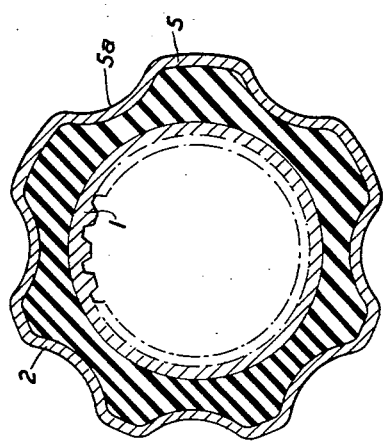
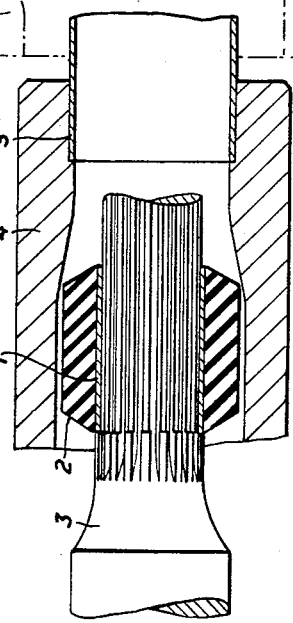
INVENTOR
WILLIAM CULL
BY Irwin S. Thompson
ATTORNEY Dec. 12, 1961 W. CULL 3,012,421
RESILIENT TORQUE TRANSMITTING COUPLINGS
AND METHODS FOR THEIR MANUFACTURE
Filed July 21, 1959 2 Sheets-Sheet 2

INVENTOR
WILLIAM CULL

BY Irvin S. Thompson

ATTORNEY

United States Patent Office 3,012,421
Patented Dec. 12, 1961

3,012,421
RESILIENT TORQUE TRANSMITTING COUPLINGS AND METHODS FOR THEIR MANUFACTURE
William Cull, Four Oaks, Sutton Coldfield, Birmingham, England, assignor of one-half to Rzeppa Limited, Birmingham, England
Filed July 21, 1959, Ser. No. 828,607
Claims priority, application Great Britain July 25, 1958
10 Claims. (Cl. 64—11)

This invention relates to resilient torque transmitting couplings of the type in which an interiorly splined inner member or bush has secured to its exterior, as by bonding, rubber or rubber-like material which is held in compression in an outer member or tube of the coupling. It is also concerned with the methods by which resilient couplings of this type are manufactured.

The usual method of manufacturing resilient couplings of the foregoing type comprises bonding or otherwise securing rubber or rubber-like material to the exterior of an interiorly splined inner member or bush and introducing the inner member and its attached rubber or the like into an outer member or tube through a tapered die thereby compressing the rubber or rubber-like material to the desired degree.

Resilient couplings of the foregoing type as hitherto constructed only transmit torque between the inner and outer members due to the friction between the compressed rubber or rubber-like material and the outer member, and consequently the couplings are of limited torque transmitting capacity; moreover the torque capacity tends to be inconsistent for any given compression of the rubber. Furthermore it is very difficult to maintain the inner and outer members of the coupling coaxial which is essential in practice.

The main object of the present invention is to provide an improved resilient torque transmitting coupling of the foregoing type, together with a method for its manufacture, with which the foregoing disadvantages of the known couplings may be avoided.

According to the invention the outer member or tube of a resilient torque transmitting coupling of the foregoing type has a longitudinal groove or recess therein. Preferably there are a plurality of such grooves or recesses angularly spaced around the axis of the coupling. The arrangement may be such that the longitudinal grooving or recessing of the outer member further compresses the rubber or rubber-like material under the/or each groove or recess.

The splined inner member is conveniently designed to provide a sliding spline when the coupling is built into a torque transmitting shaft, for example a motor vehicle propeller shaft, so as to accommodate "plunge" of the shaft, i.e. variations in the effective length of the latter. The inner member may further be formed so that the sliding spline in the assembled shaft will comprise rolling members, for example balls, arranged to run in complementary spline-ways formed in the inner member of the coupling and an associated shaft member.

The invention also embraces a method of manufacturing a resilient torque transmitting coupling of the foregoing type which comprises securing the rubber or rubber-like material to the exterior of the interiorly splined inner member or bush, introducing said inner member and its attached rubber or the like into the outer member or tube through a tapered die to compress the rubber or rubber-like material, and thereafter ball swaging said outer member or tube to form a longitudinal groove or recess therein and further compress the rubber or rubber-like material under the groove or recess.

As a result of the invention the torque transmitting capacity of resilient couplings of the foregoing type is improved by reason of the fact that, in addition to the friction between the rubber or rubber-like material and the outer member, the resistance of the rubber to flow or distort is utilised. Moreover the ball swaging of the outer member stiffens the latter and corrects any eccentricity between the inner and outer members.

Figure 4:
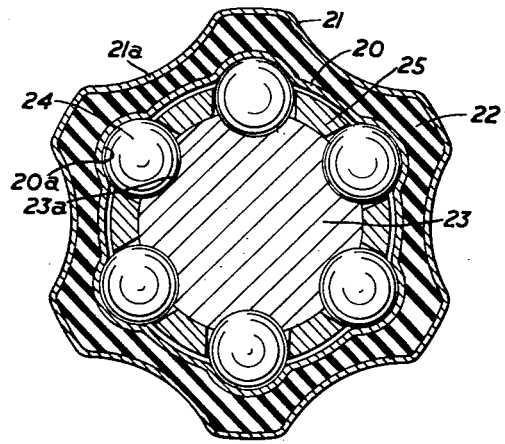

The invention will now be further described with reference to the accompanying drawings which illustrate, by way of example, two resilient torque transmitting couplings in accordance with the invention and the manufacture of one of these couplings, and in which:

FIGURE 1 is a lateral cross-sectional view of one of the couplings,

FIGURE 2 diagrammatically illustrates two consecutive stages in the manufacture of the coupling of FIGURE 1 by a method in accordance with the invention, FIGURE 3 is an axial cross-sectional view of the other of the couplings, FIGURE 4 is a lateral cross-sectional view of the coupling of FIGURE 3, and FIGURE 5 is a detail view of FIGURE 4 to a larger scale.

The coupling illustrated in FIGURES 1 and 2 comprises a cylindrical metal bush 1 which has a splined inner surface enabling it to transmit torque from or to a splined shaft engaging therewithin, such a shaft not being illustrated. The bush 1 forms the inner member of the coupling and has bonded to its outer surface an annular body of rubber 2, the half cross-section of which is roughly trapezoidal in shape with the longer of the two parallel sides lying against the outer surface of the bush 1.

Referring now to the manufacture of the coupling as shown diagrammatically in axial cross-section in FIGURE 2, the bush 1 with its bonded rubber body 2 is mounted on a splined mandrel 3 and introduced through a tapered die 4 into a cylindrical outer member or tube 5 of smaller diameter than the outer diameter of the rubber body 2, thereby compressing the latter to the desired degree. The tubular member 5 forms the tubular shaft portion of a propeller shaft suitable for use in a motor vehicle transmission system.

With the bush 1 and its bonded rubber body 2 within the outer member 5, the latter is subjected as shown in the righthand half of FIGURE 2 to ball swaging by means of balls such as 6. These balls are mounted in radial bores such as 7 in a swaging head which comprises a hollow cylindrical body portion 8 and a surrounding outer sleeve 9. The sleeve 9 has a series of arcuate recesses 10 in its inner surface, the angular distribution of which corresponds to the angular distribution of the bores 7. Thus, when the sleeve 9 is positioned relatively to the body 8 so that the bores 7 are aligned with the recesses 10 the balls 6 can enter the latter to leave unobstructed the cylindrical bore of the body 8 within which the outer member 5 is a sliding fit. With the member 5 correctly positioned within the body 8 the sleeve 9 is moved axially relatively to the body 8 to the position shown in FIGURE 2, thereby moving the balls 6 inwardly to deform the outer member 5. Axial movement of the swaging head to the position shown in chain-dotted lines at 11 results in the production of a plurality of arcuate grooves or recesses 5a extending longitudinally of the outer member 5, whereby the rubber body 2 is still further compressed under the grooves or recesses 5a. As can be seen from FIGURE 1 the outer member 5 is formed with seven grooves 5a and for this purpose the swaging head comprises 7 equiangularly arranged swaging balls 6.

The coupling of FIGURES 3, 4 and 5 is produced by a method generally similar to that already described in connection with FIGURE 2, and this coupling also is shown as embodied in a propeller shaft. As before the coupling has a splined inner member or bush 20 and a tubular outer member 21 between which is trapped and compressed an annular body of rubber 22. The outer member 21 has a series of six longitudinally extending ball swaged recesses such as 21a, but in this case the spline-ways such as 20a in the inner member 20 are provided by longitudinally extending recesses which deform the wall of the member 20 outwardly. As can be seen from FIGURE 4 the spline-ways 20a are staggered relatively to the recesses 21a so that they serve to compress the rubber 22 at points intermediate adjacent pairs of the recesses 21a.

The inner member 20 together with an associated shaft member 23 provides a sliding spline which accommodates plunge of the propeller shaft, and the shaft member 23 is provided with spline-ways such as 23a aligned with corresponding spline-ways 20a in the member 20. Six balls such as 24 run in the spline-ways 20a and 23a and form rolling members of the rolling base spline interconnecting the coupling and the shaft member 23.

As shown in FIGURE 3 a plurality of balls such as 24 runs in each spline-way 20a or 23a, and these balls are retained in radial bores in a cylindrical cage 25 which is a close fit on the shaft member 23. Axial movement of the cage 25 and the balls 24 relatively to the shaft member 23 is limited in one direction by a circlip 26 fitted in the latter.

FIGURE 5 illustrates the profiles of the spline-ways 20a and 23a which provide tracks for the balls 24. Each of these profiles is a part ellipse such that it provides a pressure angle A for the balls 24 of approximately 45°. As can be seen the areas of contact between the tracks and the balls 24 are located well inwardly of the track edges.

I claim:

1. A resilient torque transmitting coupling comprising an interiorly splined inner member of bush-like form designed to provide a sliding spline when the coupling is built into a torque transmitting shaft, a sleeve of resilient material such as rubber secured to the exterior of said inner member, and an outer member of tube-like form within which the resilient material is held in compression, said outer member being formed with a longitudinal groove which deforms the wall of that member inwardly.

2. A coupling according to claim 1, wherein the inner member is formed so that the sliding spline in the assembled shaft comprises rolling members arranged to run in complementary spline-ways formed in the inner member of the coupling and an associated shaft member.

3. A coupling according to claim 2, wherein the spline-ways in said inner member are provided by longitudinally extending recesses which deform the wall of the inner member outwardly.

4. A resilient torque transmitting coupling comprising an interiorly splined inner member, a sleeve of resilient material such as rubber bonded to the exterior of said inner member, and a tubular outer member surrounding and coaxial with said inner member and within which said resilient sleeve is held in radial compression, said outer member being longitudinally grooved to produce an increased radial compression of said resilient material beneath the grooving.

5. A coupling according to claim 4, wherein said outer member is formed with a plurality of longitudinally extending grooves equiangularly spaced around the common axis of said members.

6. A resilient torque transmitting coupling comprising a bush-like inner member, a sleeve of resilient material such as rubber secured to the exterior of said inner member, and a tube-like outer member surrounding said inner member and in frictional engagement with said sleeve which is held in radial compression between said members, said outer member being ball swaged to produce longitudinal grooving thereof and increase the radial compression of said resilient material beneath said grooving.

7. A torque transmitting shaft embodying a resilient coupling, said coupling comprising an interiorly splined inner member of bush-like form, an annular cushion of resilient material secured to the exterior of said inner member, and an outer member within which said annular cushion is radially compressed, said outer member being formed by a tubular portion of said shaft which is longitudinally grooved in the region of said annular cushion to deform said tubular portion inwardly into said cushion.

8. A torque transmitting shaft according to claim 7, wherein spline-ways in said inner member are provided by longitudinally extending recesses which deform the wall of said inner member outwardly.

9. A torque transmitting shaft according to claim 8, wherein said outer member has a plurality of grooves corresponding in number to said spline-ways, said spline-ways being annularly staggered about the shaft axis relatively to said grooves so that each spline-way is arranged between a corresponding adjacent pair of said grooves.

10. A resilient torque transmitting coupling comprising an interiorly splined inner member, a tube-like outer member arranged coaxially around said inner member with a wall deformed inwardly by a plurality of longitudinally extending grooves equiangularly arranged around the coupling axis, and an annular cushion of resilient material secured to the exterior of said inner member and introduced between said members with radial compression.

References Cited in the file of this patent

UNITED STATES PATENTS

| 1,892,037 | Crews | Dec. 27, 1932 |
| 2,174,223 | Frauenthal et al. | Sept. 26, 1939 |
| 2,686,359 | Spencer | Aug. 17, 1954 |
| 2,828,537 | Pischke et al. | Apr. 1, 1958 |
| 2,921,449 | Jackel | Jan. 19, 1960 |

FOREIGN PATENTS

| 683,833 | Great Britain | Dec. 3, 1952 |